March 5, 1957     F. A. ROBINSON     2,783,568

DECORATIVE MEMBER

Filed Oct. 19, 1955

INVENTOR.
FREDERICK A. ROBINSON
BY
*J. Warren Kinney, Jr.*
ATTORNEY 2,783,568
Patented Mar. 5, 1957

2,783,568

DECORATIVE MEMBER

Frederick A. Robinson, Coleman, Mich., assignor to Harry S. Shaffer, doing business as H. S. Shaffer & Associates, Cincinnati, Ohio Application October 19, 1955, Serial No. 541,401

2 Claims. (Cl. 41—13)

This invention relates to an expanded ball decorative element and to the method of using it in decorating.

An object of the invention is to provide a foliage article to be decorated with a plurality of individual polystyrene balls each of which is independently secured to the article by means of an adhesive.

Another object of the invention is to teach a method of inexpensively providing fire-resistant decorations for articles to be decorated therewith.

A further object of the invention is to provide a foliage article to be decorated with a plurality of expanded balls which comprise expanded polystyrene.

Still another object of the invention is to provide a decorative foliage article with expanded polystyrene balls which are adhesively secured thereto for providing a berry-like effect to the article.

These and other objects are attained by the means described herein and as disclosed in the accompanying drawings, in which.

Figure 1:
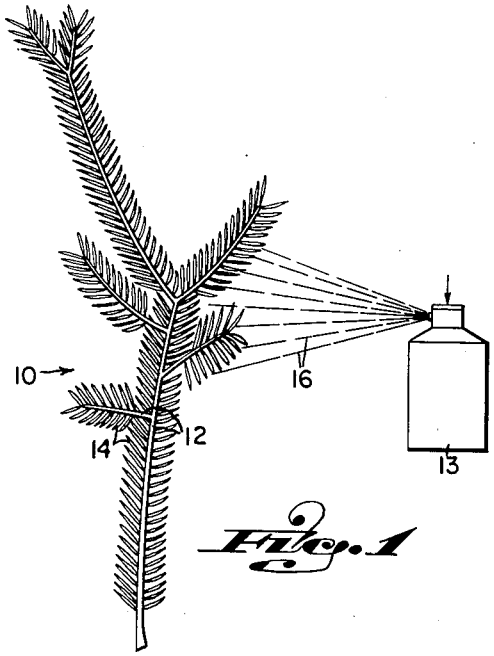
Fig. 1 is a schematic view of a decorative foliage article in the form of a sprig of evergreen in the process of being provided with an adhesive coating.
Figure 2:
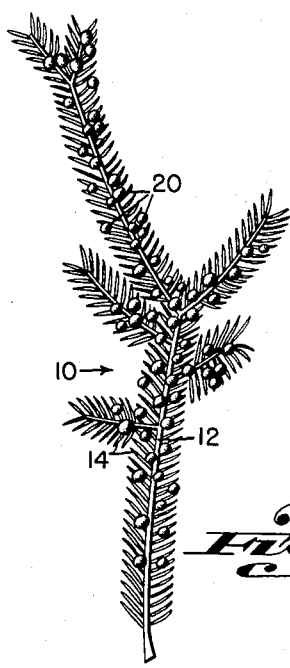
Fig. 2 is a view of the foliage article of Fig. 1 after being provided with the ornamental polystyrene balls in accordance with the teachings of the present invention.

With reference now to Figs. 1 and 2, the numeral 10 denotes generally a decorative foliage article, which term as used herein refers to and comprehends any and all types of foliage, whether real or artificial, such as, by way of example but not by way of restriction, evergreens, such as holly, spruce, juniper, and other berry-bearing plants as used by the floral trade.

In practicing the invention the foliage article to be decorated is first provided with an air-dryable adhesive which, in the preferred embodiment of the invention, may be sprayed on for thereby providing a substantially uniform coating of adhesive on the article.

Figure 3:
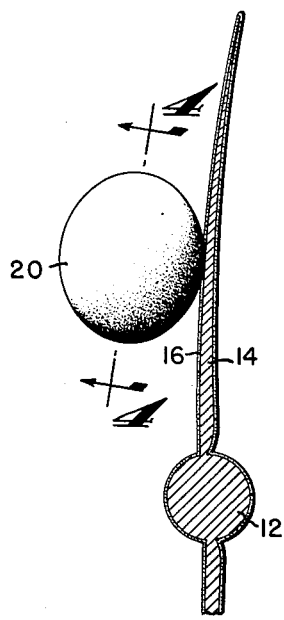
Fig. 3 is an enlarged sectional view of an individual spike of the decorative foliage article of Fig. 2 showing the manner in which an expanded polystyrene ball is secured thereto.

A plurality of expanded polystyrene balls 20 substantially spheroidally shaped are then placed on the adhesively coated surfaces, while tacky, of the foliage article whereby the overall pattern will be non-uniform, though comprehensive throughout the adhesively coated area. As best seen in Figs. 2 and 3, the balls 20 are lightly adhesively adhered to the article and are randomly disposed in relatively widely spaced relation lending a decorative appearance and leaving a major portion of the foliage uncovered to serve as a decorative background for the balls 20 which simulate berries. If desired, the balls may be spaced close together leaving only a portion of the foliage uncovered depending on the decorative effect desired.

In Fig. 3 the numeral 12 denotes a branch and the numeral 14 a spike or leaf projecting from the branch, whereas the numeral 16 indicates the adhesive coating to which balls 20 are secured. As best seen in this figure a very small portion of the periphery of each of the balls 20 are adhesively secured to the foliage article permitting a light adherence of the balls, with the remainder of the periphery extending away from the foliage article.

Figure 4:
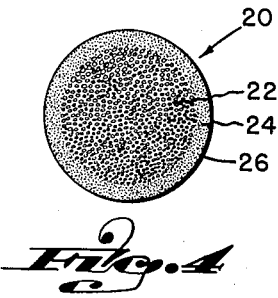
Fig. 4 is a sectional view taken on line 4—4 of Fig. 3.

The balls 20 comprise the expanded product obtained when beads or granules of a polystyrene mixture containing a foaming agent, of which Freon and pentane are examples, are subjected to a wet or a dry heat sufficient to expand the granule into an expanded ball. The degree of heat employed in the granule-expanding process should be sufficient to raise the temperature thereof above its critical temperature but below its melting temperature. By way of example, highly satisfactory results have been obtained in those instances in which the granules are placed in a steam cooker and heated from two to four minutes under pressure approximating ten pounds per square inch. As an alternate process heated air or hot fluids such as ethyl glycol may be used to heat the granules for producing the desired expansion. The resultant expanded polystyrene balls may range in size from ⅛ to ¾ of an inch in diameter and as best illustrated in Fig. 4, each of the expanded balls comprises a central core 22 of cellular material which is surrounded by a cellular shell 24 of greater density which is, in turn, completely encased within a continuous polystyrene film 26.

The granules hereinabove referred to are commercially available under the term "expandable polystyrene beads" from chemical concerns such as, by way of example, Dow Chemical Co.

The characteristics of the expanded polystyrene balls are such that when they are subjected to open flame they do not actively support combustion, but are dissipated into the air, leaving no visible residue, thereby making them ideally suited for decorative use.

If desired, the expanded polystyrene balls may be further coated with a light coating of adhesive material after they have been initially secured to the ornamental objects, in the manner illustrated in Fig. 3, said second adhesive coating serving to more firmly anchor the expanded polystyrene balls to the decorative objects; however, uniformly excellent results have been obtained, on a commercial basis, in those instances wherein the second adhesive coating was omitted.

After the expanded balls have been adhesively secured to the supporting articles, the adhesive is preferably permitted to set and dry, after which the article is shaken to dislodge those of the balls which are not securely anchored to the article.

If desired, the expanded polystyrene balls may be suitably colored whereby to impart a varied effect to the final product, however highly satisfactory results have been obtained when using the expanded balls in their natural form wherein their color is substantially white. A very striking result is obtained when white expanded polystyrene balls are secured to ornamental objects such as evergreens as illustrated in Fig. 2.

It should be understood that various changes may be made, within the scope of the appended claims, without departing from the spirit of the invention.

What is claimed is:

1. A plant product simulating a berry-bearing foliage comprising a decorative foliage article, a layer of adhesive coating the exterior surface of said article, a plurality of substantially spheroidal polystyrene balls simulating berries lightly adhesively adhered to said article, said balls being disposed on said article so as to lend a decorative appearance thereto while leaving a portion of said article uncovered to serve as a decorative background for said balls, and with a very small portion of the periphery of each of said balls adhesively secured to said article permitting said balls to be lightly adhered and with the remainder of said periphery extending away from said article.

2. A plant product simulating a berry-bearing foliage comprising a decorative foliage article, a layer of adhesive coating the exterior surface of said article and a plurality of substantially spheroidal polystyrene balls simulating berries lightly adhesively adhered to said article and disposed at random thereon, said balls being disposed in relatively widely spaced relation on said article so as to lend a decorative appearance thereto while leaving a major portion of the foliage uncovered to serve as a decorative background for said balls, and with a very small portion of the periphery of each of said balls adhesively secured to said article permitting said balls to be lightly adhered and with the remainder of said periphery extending away from said article, and a second layer of adhesive coating the exposed exterior surface of said foliage and said balls to effect a final anchoring of the balls to the article.

References Cited in the file of this patent

UNITED STATES PATENTS

| | | |
|---|---|---|
| 1,217,675 | Wilmsen | Feb. 27, 1917 |
| 2,290,428 | Hart | July 21, 1942 |
| 2,734,297 | Dunklee | Feb. 14, 1956 |

OTHER REFERENCES

Foaming-Agent-Impregnated Polystyrene Beads, Plastics World, published March 1954.